United States Patent
Miyatake et al.

(10) Patent No.: US 6,706,339 B1
(45) Date of Patent: Mar. 16, 2004

(54) LAMINATE POLARIZER AND LIQUID CRYSTAL DISPLAY

(75) Inventors: Minoru Miyatake, Osaka (JP); Takafumi Sakuramoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/558,323

(22) Filed: Apr. 26, 2000

(30) Foreign Application Priority Data

Apr. 26, 1999 (JP) ............................. 11-117548
Mar. 16, 2000 (JP) ....................... 2000-073211

(51) Int. Cl.⁷ ................. G02F 1/1336; C09K 19/54; G02B 5/30; F21V 9/14; G02C 7/12
(52) U.S. Cl. ............. 428/1.31; 349/96; 349/194; 359/490; 359/494; 252/585
(58) Field of Search ............... 428/1.31; 359/490, 359/491, 492, 494; 252/585; 349/96, 194

(56) References Cited

U.S. PATENT DOCUMENTS

| | | | |
|---|---|---|---|
| 2,123,902 A | 7/1938 | Land | 88/1 |
| 5,751,388 A | 5/1998 | Larson | 349/96 |
| 5,825,543 A | 10/1998 | Ouderkirk et al. | 359/494 |
| 5,851,422 A * | 12/1998 | Saito et al. | 252/299.01 |

FOREIGN PATENT DOCUMENTS

| | | |
|---|---|---|
| JP | 8-511109 | 11/1996 |
| JP | 9-274108 | 10/1997 |

OTHER PUBLICATIONS

WO 95/17303 Ouderkirk et al. Jun. 1995.*

* cited by examiner

Primary Examiner—Harold Pyon
Assistant Examiner—Sow-Fun Hon
(74) Attorney, Agent, or Firm—Sughrue Mion, PLLC

(57) ABSTRACT

A laminate polarizer has a dichroic polarizing sheet and a polarizing and scattering sheet showing anisotropy in scattering properties depending on a direction of polarization and being laminated on the dichroic polarizing sheet. An absorption axis of the dichroic polarizing sheet and an optical axis of the polarizing and scattering sheet in which polarized light is intensely scattered are in parallel to each other. A liquid crystal display is provided so that this laminate polarizer is disposed on a light source side of a liquid crystal panel as a polarizer.

11 Claims, 1 Drawing Sheet

LAMINATE POLARIZER AND LIQUID CRYSTAL DISPLAY

BACKGROUND OF THE INVENTION

1. Field of the Invention

This invention relates to a laminate polarizer which provides linearly polarized light having a high degree of polarization and is useful for improving visibility of a liquid crystal display, and the like.

The present application is based on Japanese Patent Application No. Hei. 11-117548 and 2000-73211, which are incorporated herein by reference.

2. Description of the Related Art

Dichroic polarizers having a dichroic substance, such as iodine, Herapathit, or a dichroic dye, adsorbed and orientated on a substrate are known. These polarizers have been frequently used in liquid crystal displays, etc. However, since the dichroic polarizers take advantage of light absorption by the dichroic substance, the resulting polarized light is usually partially polarized light. Use of such polarizers in a crossed-Nicol arrangement has involved the problem of light leakage.

Light leakage causes image contrast lower in a black display mode of a liquid crystal display. Where the concentration of adsorbed dichroic substance is increased to increase the light absorption thereby to reduce light leakage, the brightness in a white display mode considerably decreases, resulting in difficulty of improving the image visibility. The problem of reduction in visibility due to light leakage is particularly conspicuous to an extent not negligible for practical use in the case of dye-containing dichroic polarizers which are excellent in high temperature durability. The low dichroism of the dyes is also contributory to the problem.

SUMMARY OF THE INVENTION

Accordingly, an object of the present invention is to provide a polarizer which provides polarized light having a high polarization degree while minimizing light leakage in a crossed-Nicol arrangement thereby to provide a liquid crystal display having satisfactory visibility with improved contrast in a black display mode or improved brightness in a white display mode.

The present invention provides a laminate polarizer which comprises a dichroic polarizing sheet and a polarizing and scattering sheet which has anisotropy in light scattering properties depending on the direction of polarization, the absorption axis of the dichroic polarizing sheet and the optical axis of the polarizing and scattering sheet in which linearly polarized light is scattered most intensely being in parallel to each other.

The present invention also provides a liquid crystal display characterized by having the laminate polarizer as a polarizer on the light source side of the liquid crystal panel.

According to the present invention, the optical axis of the polarizing and scattering sheet in which linearly polarized light is transmitted efficiently (the direction in which linearly polarized light is hardly scattered) and the transmission axis of the dichroic polarizing sheet agree with each other. As a result, the laminate polarizer exhibits excellent transmission in that optical axis. On the other hand, the optical axis of the polarizing and scattering sheet which exhibits strong scattering properties for polarized light agrees with the absorption axis of the dichroic polarizing sheet, so that linearly polarized light is intensely scattered in this optical axis to reduce the transmittance. It follows that the laminate polarizer is, as a whole, capable of producing highly polarized light without being accompanied by large reduction in transmission.

Accordingly, a crossed-Nicol of the laminate polarizers hardly causes light leakage to provide a liquid crystal display and the like which have satisfactory visibility in terms of image contrast in a black display mode and brightness in a white display mode. The laminate polarizer of the invention can efficiently be produced simply by superposing the constituent layers on each other and is suited to mass production. Where the laminate polarizer is disposed on the light source side of the liquid crystal panel, hindrance to visibility attributed to back scatter by the polarizing and scattering sheet can be avoided to secure visibility, such as a contrast.

Features and advantages of the invention will be evident from the following detailed description of the preferred embodiments described in conjunction with the attached drawings.

DETAILED DESCRIPTION OF THE PREFERRED EMBODIMENTS

Figure 1:
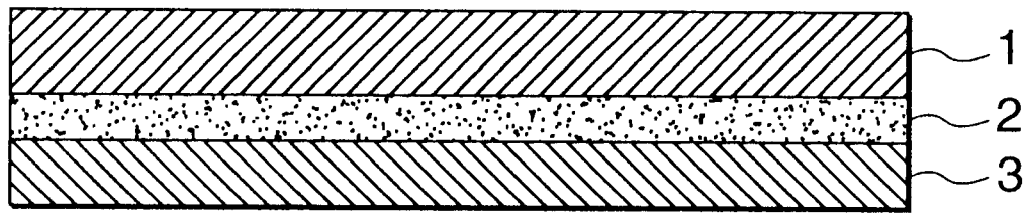
FIG. 1 is a cross-sectional view of an example of a laminate polarizer according to the present invention.
Figure 2:
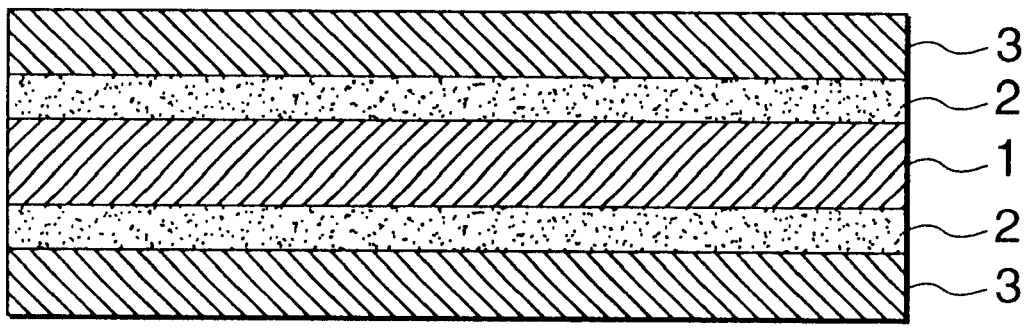
FIG. 2 is a cross-sectional view of another example of a laminate polarizer according to the invention.

The laminate polarizer of the invention comprises a dichroic laminating sheet and a polarizing and scattering sheet showing anisotropy in scattering properties depending on the direction of polarization, the absorption axis of the dichroic polarizing sheet and the optical axis of the polarizing and scattering sheet showing intense scattering properties being in parallel to each other. Examples of the laminate polarizer are shown in FIGS. 1 and 2, in which numerals 1, 2 and 3 indicate a dichroic polarizing sheet, an adhesive layer that is provided if desired, and a polarizing and scattering sheet.

The dichroic polarizing sheet is selected appropriately from those having a transmission axis and an absorption axis for linearly polarized light. Useful dichroic polarizing sheets include stretched films of hydrophilic polymers, such as polyvinyl alcohol, polyvinyl alcohol partially formal, and a partially saponified ethylene-vinyl acetate copolymer, having adsorbed a dichroic substance, such as iodine or a dichroic dye; and orientated films of polyenes, such as dehydrated polyvinyl alcohol or dehydrochlorinated polyvinyl chloride.

The dichroic polarizing sheet may have a transparent protective layer on one or both sides thereof for protection against heat, humidity, etc. The transparent protective layer is formed of, for example, transparent polymers, particularly polymers excellent in transparency, mechanical strength, heat stability, and moisture barrier properties.

The transparent polymers which can be used as a protective layer include cellulosic polymers, such as cellulose diacetate and cellulose triacetate; olefinic polymers, such as polyethylene, polypropylene, polyolefins having a cyclo- or norbornene structure, and ethylene-propylene copolymers; acrylic polymers, such as polymethyl methacrylate; polyesters, such as polyethylene terephthalate and polyethylene naphthalate; styrene polymers, such as polystyrene and acrylonitrile-styrene copolymers (AS polymers); and polyamides, such as nylon and aromatic polyamides.

Also included in the transparent polymers are polycarbonates, vinyl chloride polymers, polyimides, polysulfone, polyether sulfone, polyether ether ketone, polyphenylene sulfide, vinyl alcohol polymers, vinylidene chloride polymers, vinyl butyral polymers, polyarylates, polyoxymethylene, silicone polymers, urethane polymers, polyethers, vinyl acetate polymers, polyblends comprising these polymers, and heat- or UV-curing polymers of phenol type, melamine type, acrylic type, urethane type, urethane acrylate type, epoxy type or silicone type.

The transparent protective layer can be formed by a convenient method such as coating with a transparent polymer or laminating with a dry film. Into the transparent protective layer may be incorporated transparent particles having an average particle size of 0.5 to 50 μm to give surface roughness for light diffusing properties. The particles can be of inorganic substances which may have electrical conductivity, such as silica, alumina, titania, zirconia, tin oxide, indium oxide, cadmium oxide, and antimony oxide; or organic substances, such as crosslinked or non-crosslinked polymers. The polarizing and scattering sheet may serve as the above-described transparent protective layer. In this case, the polarizing and scattering sheet may be provided on both sides of the polarizing sheet.

The dichroic polarizing sheets useful in the invention further include those comprising an orientated coating film of a liquid crystal material containing a dichroic dye and those comprising an orientated coating film of a dichroic lyotropic liquid crystal dye. An example of the dichroic polarizing sheet comprising an orientated film of a dichroic dye-containing liquid crystal material is one prepared by spreading a mixture of a liquid crystal material and an appropriate dye having absorption dichroism on a substrate and orientating the liquid crystal material. The liquid crystal materials include liquid crystals and liquid crystalline polymers of nematic mode, smectic mode, etc. and mixtures thereof. The liquid crystal material is orientated by an appropriate means, such as an alignment layer, alignment substrate, an electric field, a magnetic field, etc.

An example of the dichroic polarizing sheet comprising an orientated film of a dichroic lyotropic liquid crystal dye is one prepared by coating a substrate under a shear stress with a solution of a water-soluble organic dye represented by formula: (chromogen) $(SO_3M)_n$, wherein the chromogen, e.g., an azo compound or a polycyclic compound, contributes to liquid crystal properties, and the sulfonic acid group or a salt thereof contributes to water solubility, thereby to exhibit as a whole lyotropic liquid crystal properties (see Japanese Patent Publication No. Hei. 8-511109). In this case, the coating layer is orientated by the shear stress imposed.

The dichroic polarizing sheet having an orientated coating film can comprise a substrate made of, for example, the polymer illustrated above as a material of the transparent protective layer and the orientated coating film provided on one or both sides of the substrate, and, if necessary, the transparent protective layer provided on the orientated coating film. The polarizing and scattering sheet may be used as the above-describe substrate so that the orientated coating film may be supported by the polarizing and scattering sheet. In this case, the dichroic polarizing sheet consists solely of the orientated coating film, which is supported by the polarizing and scattering sheet. Since there is no need to provide a separate substrate for the coating film, the resulting laminate polarizer can be made very thin.

From the standpoint of improving image brightness and contrast, the dichroic polarizing sheet or the orientated coating film is preferably a film having a high light transmittance and a high polarization degree such as the above-described film containing a dichroic dye, particularly a film having a light transmittance of 40% or more and a polarization degree of 95% or more.

On the other hand, the polarizing and scattering sheet which can be used in the laminate polarizer of the present invention is selected appropriately from those which show anisotropy in scattering properties depending on the direction of polarization. Such polarizing and scattering sheets include a transparent film having dispersed therein fine birefringent domains having different refractive index characteristics from the other portion (matrix) and having an optical axis which exhibits the maximum transmittance for linearly polarized light and another optical axis which is perpendicular to the first-mentioned optical axis in which linearly polarized light is scattered intensely (see Japanese Patent Publication No. Hei. 9-274108).

From the standpoint of suppressing light leakage by crossed-Nicol and obtaining a high light transmittance, the polarizing and scattering sheet preferably has the following scattering anisotropy. When linearly polarized light whose direction of polarization is the optical axis showing the maximum transmission for linearly polarized light (i.e., the optical axis showing the weakest scattering properties, hereinafter referred to as a $\Delta n2$ direction) or the optical axis which is perpendicular to the $\Delta n2$ direction and shows the most intense scattering properties for linearly polarized light (hereinafter referred to as a $\Delta n1$ direction), the ratio of the diffused transmittance in the $\Delta n2$ direction to that in the $\Delta n1$ direction is preferably 2 or more, still preferably 3 or more, particularly preferably 5 or more.

For securing the brightness ascribed to the transmission of polarized light in the $\Delta n2$ direction, it is preferred for the polarizing and scattering sheet to have as high a linearly polarized light transmittance in the $\Delta n2$ direction as possible, particularly to have a total light transmittance of 80% or more, especially 90% or more. Further, it is preferred for improving the polarization degree that the transmittance for linearly polarized light in the $\Delta n1$ direction be low, particularly less than 80%, especially 75% or less.

The polarizing and scattering sheet having scattering anisotropy can be designed to have a refractive index difference ($\Delta n1$) of 0.03 or greater, preferably 0.035 to 1, particularly 0.04 to 0.5, in the $\Delta n1$ direction between the fine domains and the other portion while making a difference in refractive index ($\Delta n2$) in the $\Delta n2$ direction between the fine domains and the other portion as small as possible, e.g., less than 0.03, preferably 0.02 or less, particularly 0.01 or less. Accordingly, it is desirable for the $\Delta n2$ to be as close as possible to zero. In other words, it is desirable that the refractive index in the $\Delta n2$ direction in the fine domains and that in the other portion be practically equal. The polarizing and scattering sheet having such refractive index differences exhibits excellent scattering properties in its $\Delta n1$ direction and excellent performance in maintaining the polarized state and securing straight transmission of the polarized light in its $\Delta n2$ direction.

According to the above embodiment, the scattering anisotropy of the polarizing and scattering sheet is ascribed to the above-described refractive index differences, $\Delta n1$ and $\Delta n2$. The polarizing and scattering sheet having such characteristics can be formed by, for example, orientating (for example, by stretching) a film comprising an appropriate combination of transparent materials, such as polymers and liquid crystals, which are selected so as to form domains different from the other portion in birefringence characteristics. For example, a combination of a polymer(s) and a liquid crystal compound(s), a combination of an isotropic polymer(s) and an anisotropic polymer(s), or a combination of anisotropic polymers can be used. A combination of materials which undergo phase separation is preferred in view of dispersibility of fine domains. The dispersibility of fine domains can be controlled by the miscibility of the materials combined. Phase separation can be induced by, for example, dissolving immiscible materials in a solvent or mixing immiscible materials by heat-melting.

Where a combination of materials is orientated by stretching, a combination of a polymer and a liquid crystal compound or a combination of an isotropic polymer and an anisotropic polymer is stretched at an arbitrary stretching temperature at an arbitrary stretching ratio, or a combination of anisotropic polymers is stretched under properly controlled stretching conditions, thereby to form a desired polarizing and scattering sheet. While anisotropic polymers are divided into the positive and the negative according to the change of refractive index in the stretching direction, both anisotropic polymers, either positive or negative, can be used in the present invention. For example, positively or negatively anisotropic polymers may be combined, or a positively anisotropic polymer and a negatively anisotropic polymer may be combined.

Useful polymers include the transparent polymers previously enumerated as a material of the transparent protective layer. From the standpoint of thermal stability of the optical characteristics, it is preferred to use a transparent film-forming polymer having a heat distortion temperature of 80° C. or higher and a glass transition temperature (hereinafter "Tg") of 110° C. or higher.

Useful liquid crystals include low-molecular weight liquid crystal compounds or crosslinking liquid crystal monomers which exhibit a nematic phase or a smectic phase at room temperature or high temperature, such as cyanobiphenyl compounds, cyanophenylcyclohexane compounds, cyanophenyl ester compounds, phenyl benzoate compounds, phenylpyrimidine compounds, and mixtures thereof; and liquid crystal polymers showing a nematic phase or a smectic phase at room temperature or high temperature. The crosslinking liquid crystal monomers are usually subjected to orientation followed by crosslinking by an appropriate means such as heat or light to become polymers.

For obtaining a polarizing and scattering sheet excellent in heat resistance and durability, it is particularly preferred to use a transparent film-forming polymer whose Tg is 50° C. or higher, particularly 80° C. or higher, especially a polymer having a Tg of 110° C. or higher and a heat distortion temperature of 80° C. or higher, in combination with a crosslinking liquid crystal monomer or a liquid crystal polymer. The liquid crystal polymers to be used are not particularly limited and can be selected appropriately from main chain types, side chain types, and the like. Liquid crystal polymers having a degree of polymerization of 8 or more, preferably 10 or more, still preferably 15 to 5000, are preferred from the standpoint of capability of forming fine domains with excellent uniformity of particle size distribution, thermal stability, film forming properties, ease of orientation treatment, and the like.

The polarizing and scattering sheet comprising a liquid crystal polymer is formed by, for example, mixing one or more of polymers for forming a transparent film and one or more liquid crystal polymers for making fine domains, molding the mixture into a film having the liquid crystal polymer(s) finely dispersed in the form of fine domains, and orientating the resulting film by an appropriate method to form domains different in birefringence characteristics from the matrix polymer.

In view of controllability on the refractive index differences $\Delta n1$ and $\Delta n2$ by an orientation treatment, it is preferred to use liquid crystal polymers which have a Tg of 50° C. or higher and exhibit a nematic liquid crystal phase in a temperature range lower than the Tg of the polymers used in combination. Such liquid crystal polymers can include side chain type liquid crystal polymers comprising a monomer unit represented by formula:

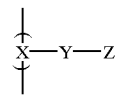

In the above formula, X is a skeleton group forming the main chain of the liquid crystal polymer, which is linked to form a linear chain, a branched chain, a cyclic chain, etc. Examples of polymers as X include polyacrylates, polymethacrylates, poly-α-haloacrylates, poly-α-cyanoacrylates, polyacrylamides, polyacrylonitriles, polymethacrylonitriles, polyamides, polyesters, polyurethanes, polyethers, polyimides, and polysiloxanes.

Y is a spacer group branching off the main chain. Spacer groups Y which are preferred for ease of forming a polarizing and scattering sheet (such as refractive index controllability) include ethylene, propylene, butylene, pentylene, hexylene, octylene, decylene, undecylene, dodecylene, octadecylene, ethoxyethylene, and methoxybutylene groups.

Z is a mesogen group contributory to nematic orientation. Suitable mesogen groups are shown below.

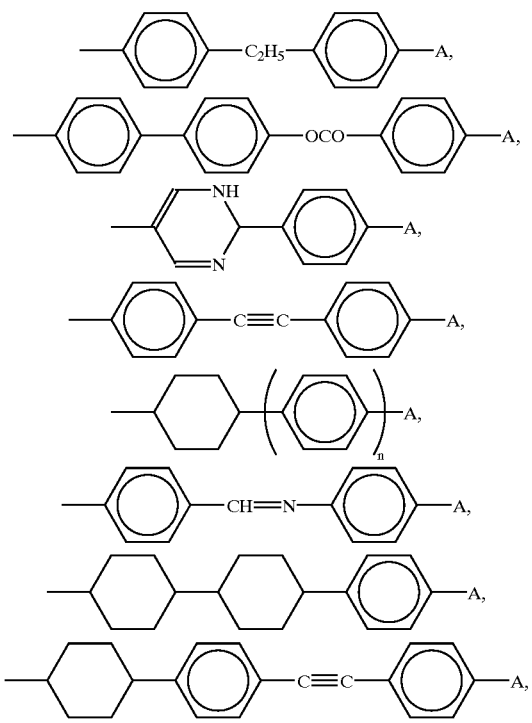

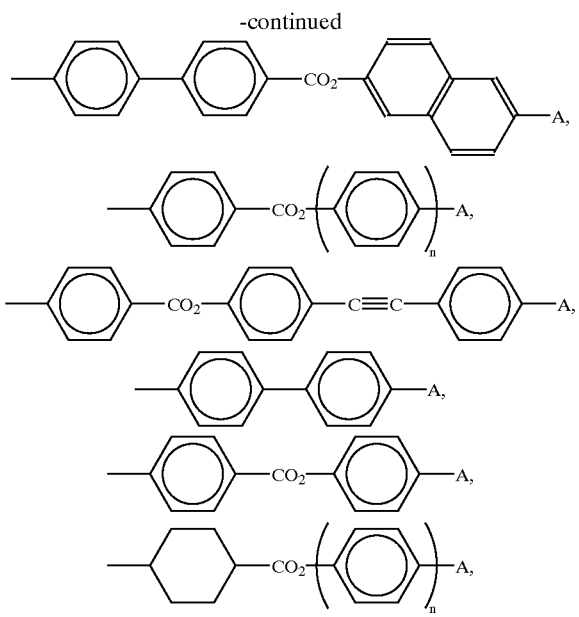

In the above formulae, the end group A can include a cyano group, an alkyl group, an alkenyl group, an alkoxy group, an oxyalkyl group, and an alkyl, alkoxy or alkenyl group having at least one hydrogen atom substituted with fluorine or chlorine.

The spacer group Y and the mesogen group Z may be linked via an ether linkage (—O—). The phenyl group in the mesogen group Z may have its one or two hydrogen atoms substituted with halogen, preferably chlorine or fluorine.

The side-chain type liquid crystal polymers having nematic orientation properties can include thermoplastic polymers, such as homopolymers or copolymers comprising the above-described monomer unit. Those excellent in monodomain orientation properties are particularly preferred. These liquid crystal polymers are also useful for the formation of the above-mentioned dichroic polarizing sheet.

The polarizing and scattering sheet comprising the above-described liquid crystal polymers having nematic orientation properties is obtained, for example, as follows. One or more film-forming polymers and one or more liquid crystal polymers which have a Tg of 50° C. or higher (preferably 60° C. or higher, particularly 70° C. or higher) and exhibit a nematic phase in a temperature range lower than the Tg of the film-forming polymers are mixed and molded into a polymer film having the liquid crystal polymer(s) dispersed therein in the form of fine domains, heating the film to orientate the liquid crystal polymer(s) forming the fine domains in a nematic phase, and fixing the orientation by cooling.

The polymer film having fine domains dispersed therein can be formed by a convenient method, such as film casting, extrusion, injection molding, and calendering. The polymer film may also be formed by once spreading a monomer mixture into film, which is then polymerized by heating or irradiation with ultraviolet light, etc.

For obtaining a polarizing and scattering sheet having the fine domains uniformly distributed, the polymer film to be orientated is preferably formed by casting a solution of the polymers in a solvent followed by drying. The size and distribution of the fine domains can be controlled by the choice of the solvent used, the viscosity of the solution, the drying rate of the cast film, and the like. For example, reduction of the viscosity of the polymer solution or increase of the drying rate is advantageous for reducing the area of the fine domains.

The thickness of the polymer film to be orientated is decided appropriately. Taking ease of orientation, etc. into consideration, the thickness is preferably 1 μm to 3 mm, still preferably 5 μm to 1 mm, particularly preferably 10 to 500 μm. The film-forming mixture can contain various additives, such as a dispersant, a surface active agent, an ultraviolet absorber, a tone regulator, a flame retardant, a parting agent, and an antioxidant.

Orientation of the film can be carried out by any one or more methods of orientation by which refractive indices are controllable. Such methods include stretching (uniaxial stretching, biaxial stretching, successive biaxial stretching, Z-axis stretching, etc.), calendering, a method comprising applying an electric field or a magnetic field to the film at or above a Tg or at or above a liquid crystal transition temperature and quenching the film to fix the orientation, a method in which orientation is induced while the flowable film-forming material is made into film, and a method in which liquid crystals are let to self-orientate based on the slight orientation of an isotropic polymer. That is, the polarizing and scattering sheet may be either a stretched film or a unstretched film. For use in stretched films, polymers having excellent ductility are preferred. Brittle polymers are also employable, though.

Where the fine domains are made of the aforementioned liquid crystal polymers, orientation can also be effected by a method comprising melting the liquid crystal polymer dispersed as fine domains at a temperature at which it assumes the objective liquid crystal phase, e.g., a nematic phase and orientating the liquid crystal polymer under the action of an orientation regulating force, followed by quenching to fix the orientated state. In order to prevent variations in optical characteristics, the aligned state of the fine domains is preferably monodomain orientation.

The orientation regulating force as referred to above is a force capable of orientating liquid crystal polymers, including the stretching force in stretching the polymer film at an appropriate draw ratio, the shearing force in film formation, an electric field, and a magnetic field. These forces can be used either individually or as a combination thereof.

The portion other than the fine domains in the polarizing and scattering sheet may be either birefringent or isotropic. The polarizing and scattering sheet exhibiting birefringence as a whole is prepared by using a film-forming polymer exhibiting birefringence upon orientation and inducing molecular orientation during the above-described film forming process. If desired, a known means for orientation, such as stretching, could be added to the film to impart or control birefringence. The polarizing and scattering sheet in which the portion other than the fine domains is isotropic is prepared by, for example, using an isotropic film-forming polymer and stretching the resulting film in a temperature range below the Tg of the film-forming polymer.

Accordingly, the above-described orientation treatment for the fine domains can be regarded as an operation for increasing the refractive index difference Δn1 in the Δn1 direction and/or decreasing the refractive index difference Δn2 in the Δn2 direction by orientating the material forming the fine domains, such as liquid crystal polymers, in a given direction to as high a degree as possible.

It is preferred for the fine domains in the polarizing and scattering sheet to be dispersed and distributed as uniformly as possible for obtaining uniformity in the scattering effect, and the like. The size of the fine domains, especially the length in the scattering direction (the Δn1 direction) is dependent on the back scatter (reflection) or the wavelength dependence. The size of the fine domains, especially the length in the Δn1 direction is decided appropriately taking into consideration improvement of light utilization efficiency, prevention of coloring due to wavelength dependence, prevention of the fine domains' interfering with image visibility or image clearness, film forming properties, film strength, and the like. In general, the average length in the Δn1 direction is preferably from 0.05 to 500 μm, still preferably from 0.08 to 250 μm, particularly preferably 0.1 to 50 μm. The length in the Δn2 direction of the fine domains dispersed in the polarizing and scattering sheet is not particularly limited.

The proportion of the fine domains in the polarizing and scattering sheet is selected appropriately in accordance with the scattering properties in the Δn1 direction, and the like. With the film strength being taken into consideration as well, it is usually 0.1 to 70% by weight, preferably 0.5 to 50% by weight, still preferably 1 to 30% by weight.

The polarizing and scattering sheet may be a single-layer film having the above-mentioned birefringence characteristics or may be a laminate sheet composed of two or more of such films. The laminate sheet will exhibit synergism in scattering effect over summation of the thicknesses. The two or more films may be superposed with their Δn1 directions or the Δn2 directions making an arbitrary angle, but for enhancement of the scattering effect, they are preferably superposed with their Δn1 directions being parallel to each other. The number of the films to be superposed is selected appropriately.

The Δn1 or Δn2 of the two or more films to be superposed may be the same or different. While it is preferred for the upper and lower films to be as parallel as possible with reference to their Δn1 directions, etc., slight derivation from parallelism due to errors in the laminating operation is allowable. In case where the films show variation in their Δn1 direction, etc., the parallelism is to be designed based on the average directions.

While the two or more films in the laminate may be in a merely superposed state, they are preferably joined together via an adhesive layer and the like so as to prevent sliding of the optical axes, such as the Δn1 direction, and to prevent foreign matter from entering each interface between the films. An appropriate adhesive of hot-melt type, pressure-sensitive type, etc. can be used. In order to suppress a reflection loss due to the adhesive layer, it is preferred that the difference in refractive index between the adhesive layer and the adherend films be as small as possible. Such a difference in refractive index could be minimized by using the same polymer as the polymer constituting the film matrix or the fine domains.

The laminate polarizer according to the present invention is a laminate of the dichroic polarizing sheet and the polarizing and scattering sheet with the absorption axis of the former and the optical axis of the latter which exhibits intense scattering properties (the Δn1 direction) being in parallel to each other. As shown in FIG. 2, the polarizing and scattering sheet 3 may be provided on each side of the dichroic polarizing sheet 1. The above-described parallelism between the films making up the laminated polarizing and scattering sheet applies to the relationship between the dichroic polarizing sheet 1 and the polarizing and scattering sheet 3 and also to the relationship between the two polarizing and scattering sheets 3, 3 provided on each side of the dichroic polarizing sheet 1. Where the dichroic polarizing sheet and the polarizing and scattering sheet are formed by stretching, the absorption axis of the former and the Δn1 direction of the latter usually agree with the stretching direction. In such cases, the films can be subjected to laminating while being stretched by means of rolls thereby to produce the laminate polarizer of the invention in a continuous manner with good efficiency.

In the practical use of the laminate polarizer of the invention, it may be laminated with necessary optical elements, such as a phase retarder. The optical element may be simply superposed on the laminate polarizer or may be adhered to the laminate polarizer via an adhesive layer, etc. The same adhesives as could be used for producing the laminated polarizing and scattering sheet can be used.

The optical elements which can be combined with the neutral polarizer of the present invention can include, but are not limited to, a phase retarder, a backlighting scheme (e.g., a light pipe), a beam splitter composed of a reflective coating or a multilayered coating, a liquid crystal cell, and so forth. The optical elements to be combined, such as a phase retarder, can be of various types. For example, phase retarders which can be used in combination include a quarter retarder, a half retarder, a phase retarder of uniaxially or biaxially orientated film type, a phase retarder which is orientated not only uniaxially or biaxially but in the thickness direction to have tilted orientation, a phase retarder of liquid crystal polymer type, a phase retarder for compensating for the phase difference due to an angle of vision or birefringence, and a laminate of these types of phase retarders.

More specifically, the useful phase retarders include stretched films comprising transparent polymers, such as those described above for use in the transparent protective layer, the polarizing and scattering sheet, etc. and films comprising liquid crystalline polymers, particularly those showing twisted orientation.

The light pipes include a transparent resin plate having on one edge thereof a light source, such as a linear light source (e.g., a cold or hot cathode fluorescent tube), a light-emitting diode, an electroluminescent device, etc. so that the light of the light source may be transmitted through the resin plate and emitted from one side of the plate through diffusion, reflection, diffraction, interference, etc. In making a laminate polarizer having a light guide, auxiliary means, such as a prism array comprising a prism sheet for controlling the light emission direction, a diffuser for obtaining uniform light emission, and a light source holder for guiding the light emitted from the linear source to the side of the light pipe, are provided in a layer or, if necessary, two or more layers, on predetermined positions, e.g., on the upper and lower edges or the side of the light guiding plate.

In making the laminate containing the laminate polarizer, one or more than one optical elements can be used. Two or more layers of the same optical element, such as a phase retarder, may be provided. The two or more layers of an optical element (e.g., a phase retarder) may have the same or different optical characteristics. The optical elements are disposed at appropriate positions either inside or outside the laminate. The laminate polarizer and its laminate with optical elements could be produced by successively superposing separately prepared constituent layers in a predetermined order in the production line of, for instance, liquid crystal displays, but it is desirable for the constituent layers be previously joined to form a unitary laminate as described above for quality control and for improved efficiency in laminating.

If desired, each layer constituting the laminate polarizer or the laminate thereof with optical elements can contain an ultraviolet absorber, such as salicylic ester compounds, benzophenol compounds, benzotriazole compounds, cyanoacrylate compounds, and nickel complex salts.

The laminate polarizer according to the invention can be used in applications in conformity to conventional ones, such as production of liquid crystal displays, taking advantage of the above-described characteristics. In producing liquid crystal displays, for example, the laminate polarizer of the invention can be applied to any appropriate type of a liquid crystal display panel. While the position of arranging the laminate polarizer in liquid crystal displays is not limited, it is desirably disposed on the light source side of the liquid crystal panel as a polarizer so as to avoid hindrance to visibility attributed to back scatter by the polarizing and scattering sheet.

EXAMPLE 1

A mixture of 970 parts by weight of a norbornene resin having a Tg of 182° C. (Arton (RTM) available from JSR; heat distortion temperature: 165° C.) and a 20 wt % dichloromethane solution of 30 parts by weight of a liquid crystal polymer represented by formula:

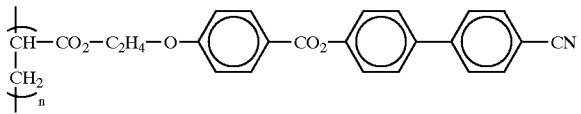

having a Tg of 80° C. and a nematic phase transition temperature of 100 to 290° C. was cast to form a polymer film having a thickness of 70 μm, which was stretched twice at 180° C., followed by quenching to obtain a polarizing and scattering film.

The resulting polarizing and scattering film was found to comprise a transparent birefringent film of the norbornene resin matrix having dispersed therein fine domains of the liquid crystal polymer. The fine domains were of substantially the same shape with their major axis in parallel with the stretching direction. The Δn1 and Δn2 of the film were 0.230 and 0.029, respectively. The liquid crystal polymer domains had an average length of 1 μm in the Δn1 direction as estimated from the coloration due to the phase difference under observation through a polarizing microscope. The diffuse transmittance of linearly polarized light was 11% in the Δn1 direction (minimum transmittance) and 67% in the Δn2 direction (maximum transmittance) as measured with a haze meter, giving a Δn2 direction to Δn1 direction transmittance ratio of 6.1. When linearly polarized light was incident on the film, the total light transmittance in the Δn1 direction and the Δn2 direction was 75% and 92%, respectively, as measured with an integrating sphere type spectrophotometer.

The resulting polarizing and scattering film was laminated with a dichroic polarizing sheet comprising a iodine-stained polyvinyl alcohol stretched film having a transmittance of 44% and a polarization degree of 97.0% via an acrylic pressure-sensitive adhesive layer with the Δn2 direction of the former being in parallel with the absorption axis of the latter to obtain a laminate polarizer.

EXAMPLE 2

A laminate polarizer was prepared in the same manner as in Example 1, except that the polarizing and scattering film was adhered to each side of the dichroic polarizing sheet.

EXAMPLE 3

A laminate polarizer was prepared in the same manner as in Example 1, except that two polarizing and scattering films prepared in Example 1 were superposed on the same side of the dichroic polarizing sheet.

EXAMPLE 4

A laminate polarizer was prepared in the same manner as in Example 1, except for replacing the iodine-containing dichroic polarizing sheet with a dye-containing dichroic polarizing sheet having a transmittance of 41% and a polarization degree of 90.0%.

COMPARATIVE EXAMPLE 1

The iodine-containing dichroic polarizing sheet of Example 1 was used alone without the polarizing and scattering film.

COMPARATIVE EXAMPLE 2

The dye-containing dichroic polarizing sheet of Example 4 was used alone without the polarizing and scattering film.
Evaluation:

The total light transmittance of the laminate polarizers prepared in Examples and the dichroic polarizing sheet of Comparative Examples was measured with an integrating sphere type spectrophotometer. Further, two of the (laminate) polarizing sheets were arranged in a crossed-Nicol or a parallel Nicol, and the transmittance was measured, from which the polarization degree P was calculated from the following equation. The results obtained are shown in Table 1 below.

TABLE 1

$$P = 100 \times \sqrt{\frac{[(\text{parallel transmittance} - \text{crossed transmittance})}{(\text{parallel transmittance} + \text{crossed transmittance})]}}$$

| | Transmittance (%) | P (%) |
|---|---|---|
| Example 1 | 43.9 | 98.0 |
| Example 2 | 43.5 | 98.7 |
| Example 3 | 43.5 | 98.7 |
| Example 4 | 40.8 | 92.0 |
| Comp. Example 1 | 44.0 | 97.0 |
| Comp. Example 2 | 41.0 | 90.0 |

It can be seen from Table 1 that the combination of the dichroic polarizing sheet with the polarizing and scattering sheet brings about an improvement in polarization degree without being accompanied by great reduction in transmittance. Where two polarizing and scattering sheets are provided on the dichroic polarizing sheet, the polarization degree is further improved.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:
1. A laminate polarizer comprising:
a dichroic polarizing sheet; and
a polarized-light scattering sheet anisotropy in scattering properties depending on a direction of polarization and being laminated on said dichroic polarizing sheet, wherein an absorption axis of said dichroic polarizing sheet and an optical axis of said polarized-light scattering sheet in which polarized light is intensely scattered are in parallel to each other, and wherein said laminated polarizer improves a degree of polarization of transmitted light without an increase in reflectance; wherein said polarized-light scattering sheet comprises a transparent film having dispersed therein fine domains different from a remaining portion of said polarized-light scattering sheet in birefringence characteristics, wherein a difference in refractive index between said fine domains and said remaining portion is 0.03 to 0.5 in an optical axis in which linearly polarized light is scattered most intensely ($\Delta n1$ direction) and less than 0.03 in an optical axis in which linearly polarized light is scattered most weakly ($\Delta n2$ direction), and said fine domains comprise a liquid crystal polymer which has a glass transition temperature of 50° C. or higher or a liquid crystal polymer formed from crosslinking crosslinkable liquid crystal monomers, and exhibits a nematic liquid crystal phase in a temperature range lower than a glass transition temperature of a polymer forming said remaining portion.

2. A laminate polarizer according to claim 1, wherein said dichroic polarizing sheet and said polarized-light scattering sheet are joined via an adhesive layer.

3. A laminate polarizer according to claim 1, wherein said polarized-light scattering sheet also serves as a transparent protective layer on at least one said dichroic polarizing sheet.

4. A laminate polarizer according to claim 1, wherein said dichroic polarizing sheet comprises a stretched film of a polyvinyl alcohol resin dyed with a dichroic dye.

5. A laminate polarizer according to claim 1, wherein said dichroic polarizing sheet comprises an orientated coating film of a liquid crystal material containing a dichroic dye.

6. A laminate polarizer according to claim 1, wherein said dichroic polarizing sheet comprises an orientated coating film of a dichroic lyotropic liquid crystal dye.

7. A laminate polarizer according to claim 5, wherein said orientated coating film is supported by said polarized-light scattering sheet.

8. A laminate polarizer according to claim 6, wherein said orientated coating film is supported by said polarized light scattering sheet.

9. A laminate polarizer according to claim 1; wherein said fine domains have an average length of 0.1 to 50 $\mu$m in the $\Delta n1$ direction.

10. A laminate polarizer according to claim 1, wherein said polymer forming said remaining portion has a heat distortion temperature of 80° C. or higher and the glass transition temperature of 110° C. or higher.

11. A liquid crystal display having the laminate polarizer according to any one of claims 1 to 10 as a polarizer on a light source side of a liquid crystal panel.

* * * * *